(12) United States Patent
Lichtman

(10) Patent No.: US 8,909,052 B2
(45) Date of Patent: Dec. 9, 2014

(54) METHOD FOR DISPERSION COMPENSATION IN A MESH OPTICAL NETWORK, AND A NETWORK USING SAME

(75) Inventor: Eyal Lichtman, Ramat Gan (IL)

(73) Assignee: ECI Telecom Ltd., Petach Tikva (IL)

( * ) Notice: Subject to any disclaimer, the term of this patent is extended or adjusted under 35 U.S.C. 154(b) by 92 days.

(21) Appl. No.: 13/597,555

(22) Filed: Aug. 29, 2012

(65) Prior Publication Data
US 2013/0051799 A1 Feb. 28, 2013

(30) Foreign Application Priority Data

Aug. 29, 2011 (IL) .......................................... 214875

(51) Int. Cl.
*H04J 14/02* (2006.01)
*H04B 10/00* (2013.01)
*H04B 10/04* (2006.01)
*H04B 10/2525* (2013.01)

(52) U.S. Cl.
CPC ................................ *H04B 10/25253* (2013.01)
USPC ............. 398/81; 398/148; 398/147; 398/158

(58) Field of Classification Search
USPC .................... 398/81, 147, 158, 159
See application file for complete search history.

(56) References Cited

U.S. PATENT DOCUMENTS

2001/0009468 A1* 7/2001 Fee ............................... 359/161
2004/0028319 A1* 2/2004 Ajgaonkar et al. ............. 385/16

OTHER PUBLICATIONS

Reduction of intrachannel nonlinear distortion in 40-Gb/s-based WDM transmission over standard fiber, Aug. 29, 2000, Killet et al.*
New Field Trial Distance Record of 3040 km on Wide Reach WDM with 10 and 40 Gbps Transmission Including OC-768 Trafiec Without Regeneration 2006, Chen et al.*

* cited by examiner

*Primary Examiner* — Shi K Li
*Assistant Examiner* — Mina Shalaby
(74) *Attorney, Agent, or Firm* — Browdy and Neimark, PLLC

(57) ABSTRACT

A method is provided for carrying out dispersion compensation in an optical mesh network supporting simultaneously traffic services being provided at two or three different bit rates including a basic bit rate being 10 Gbps and at least one higher bit rate selected from among 40 Gbps and 100 Gbps. The method comprises the following steps: providing in-line dispersion compensation for every span in the network so as to reach positive average residual dispersion RDS per span extending to less than about 3 km; providing start points of possible trails in the network with respective external, pre-compensation negative Dispersion Compensation modules (DCMs), and providing termination points of possible trails in the network with respective external post-compensation positive DCMs.

9 Claims, 3 Drawing Sheets

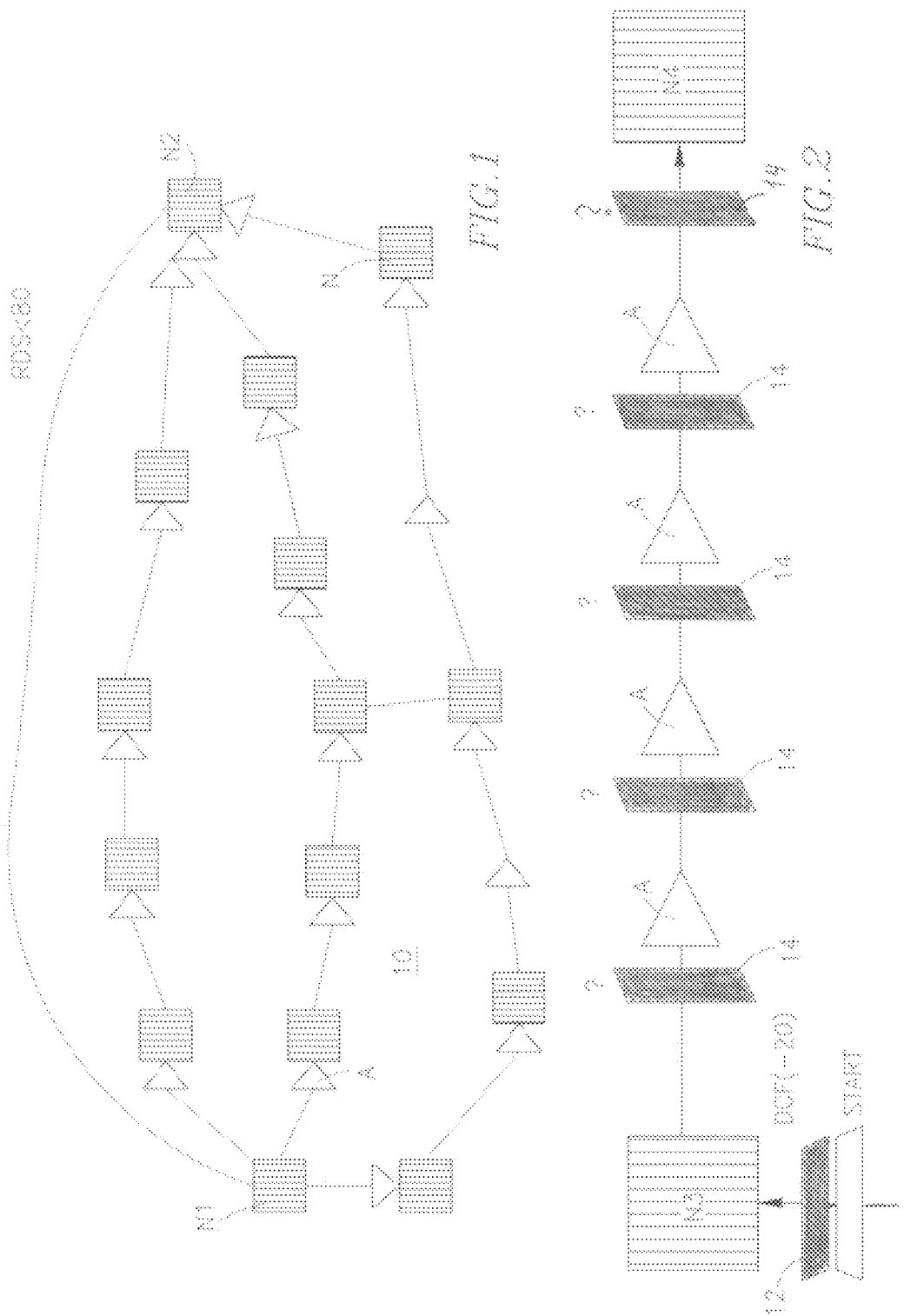

METHOD FOR DISPERSION COMPENSATION IN A MESH OPTICAL NETWORK, AND A NETWORK USING SAME

CROSS-REFERENCE TO RELATED APPLICATIONS

This application claims priority of Israel Patent Application No. 214875, filed Aug. 29, 2011, the disclosure of which is incorporated by reference herein in its entirety.

FIELD OF THE INVENTION

The present invention relates to a technology for designing an optical mesh network to balance chromatic dispersion in it and to minimize non-linearity impairments in the network, and to the resulting mesh network where the dispersion is balanced/compensated.

BACKGROUND OF THE INVENTION

Various methods of mapping dispersion in optical networks are known in the art.

US2010329695A relates to dispersion slope compensation and dispersion map management systems and methods in an optical network utilizing a reconfigurable optical add-drop multiplexer (ROADM) with a plurality of different values of dispersion compensation modules (DCMs). The DCMs form a dispersion compensation ladder at certain intermediate nodes in the optical network to provide dispersion slope compensation and dispersion map management. The reconfigurable routing structure of the ROADM enables these intermediate nodes to route individual wavelengths to any one of the DCMs as required for the particular path of the wavelength. The solution removes the requirement for banded compensation at receiver nodes and allows for dispersion map management at intermediate points along a fiber route.

The solution requires dispersion map management at intermediate nodes, thus it requires knowing trails in advance, which is problematic in mesh networks.

US2008069573A configures an all-optical network such that at least eighty percent of optical fiber spans of a portion of a first all-optical path of the network have substantially a first residual dispersion per span and at least eighty percent of optical fiber spans of a remainder of the first all-optical path have residual dispersions per span substantially differing from the first residual dispersion per span. The remainder of the first all-optical path includes an overlap between the first all-optical path and a second all-optical path of the network. The second all-optical path has a plurality of optical fiber spans and a substantially singly periodic dispersion map.

Though speaking about overlapping trails in a mesh network, the above solution offers the method that depends on knowing the trails in advance, ahead of time.

US2007183711A describes how Dispersion may be managed in a branched optical network by using transmission segments having a single period segment dispersion map. One or more of such segments may be coupled to network nodes such as terminals or branching units such that dispersion may be managed even when the network is reconfigured. In one embodiment, a single period segment dispersion map provides dispersion compensation at the ends of the segment. In another embodiment, a single period segment dispersion-map provides dispersion compensation at the middle of the segment.

There are some known approaches how to map dispersion in a network serving for conveying traffic at a specific bit rate.

For example, the article "Analytical description of cross-phase modulation in dispersive optical fibers", M. Shtaif, Optics Lesteres, vol. 23 (1998) discusses requirements to chromatic dispersion in 10G networks.

The work "Reduction of intrachannel nonlinear distortion in 40 Gb/s based WDM transmission over standard fiber", R. I. Killey et al., IEEE Photon. Tech. let. Vol. 12 (2000) discusses ways of dispersion management in 40G networks.

To the best of the Applicant's knowledge, neither of the prior art references describes how dispersion can be mapped so as to minimize non-linearity impairments in a mesh network, that simultaneously supports traffic at two or more different bit rates which require different and contradicting approaches for dispersion compensation.

SUMMARY OF THE INVENTION

Dispersion mapping which would allow minimizing non-linear impairments seems problematic in mesh networks, since trails of traffic services in the mesh usually overlap one another, may start and terminate at any node of the network, and since any span may be the first span of one trail, and simultaneously the last span of another trail in the mesh network. In mesh networks, where trails practically cannot be predicted and pre-counted in advance, dispersion mapping turns to be a serious problem, especially in case when different bit rates are used in the network.

Surprisingly, in view of all the problems noticed above, there exists quite a simple solution which has been found by the Inventor. The advantage of this solution that it does not need to know the trails in advance—it only needs to know possible termination points (say, ADD and Drop points) of traffic trails in the mesh network.

There is another important aspect of the problem, which has been noted (and then addressed) by the Inventor.

It is known to those skilled in the art, that different bit rates of traffic raise different requirements to chromatic dispersion in the trail used by the traffic, and in particular—different requirements to minimizing nonlinear impairments.

As has been mentioned in the background description, there are more or less accepted approaches to mapping dispersion in networks for widely used traffic services of 10G, and separately—for traffic of 40 G.

However, nobody tried to address the most practical task of performing dispersion mapping in an optical mesh network which is simultaneously utilized by services having different bit rates. Moreover, nobody simultaneously tried to resolve the problem of minimizing non-linear impairment by dispersion mapping in mesh networks.

The Inventor bases his concept on two different approaches (sets of requirements) which are respectively accepted for 10 G and 40 G networks by the two scientific articles mentioned in the background description. Namely:

The first article teaches that for a network utilizing traffic services substantially at 10 G (i.e., close to 10 Gbit/s), the following requirement should be satisfied:

1) Total residual dispersion per trail of service is positive (the same sign of the dispersion of the transmission fiber) and lower than linear dispersion tolerance of the specific transceiver of the trail (usually, 40 km or 80 km);

Further, as has been noticed by the Inventor while performing his research and computer simulations, one possible solution to handle non-linearity of dispersion for a trail handling traffic at 10 Gbps would be to have residual dispersion RDS of the last span greater than about 20 km. Let this Inventor's finding be considered an additional requirement 2) for the 10 Gbps networks.

The second article recommends that for a network utilizing traffic services at the bit rate close to 40 G, a second set of requirements be satisfied:

3) Dispersion pre-compensation of about minus 20 km (−20 km) per trail of service, wherein the negative dispersion is dispersion having the sign opposite to that of the transmission fiber;

4) Average residual dispersion RDS per span is less than of about 3 km and substantially in the range −3≤RDS≤3;

Yet further, the Inventor has checked and found out that, in practice, requirements for dispersion compensation in 40 Gbps trails are actually the same as the requirements to trails carrying traffic at a more advanced bit rate of 100 Gbps.

As can be seen, trails carrying traffic at 10 G and 40 G have different recommended optimal dispersion maps. However, they need to share the same actual/physical map. Moreover, in a mesh network, the dispersion map should be optimized for every possible trail. Indeed, trails usually overlap with one another so that every span may be the first span of one trail and the intermediate or the last span of other trails, and moreover—trails may be used by traffic of different bit rates.

The Inventor is the first to propose a method of dispersion compensation (or a method of dispersion mapping) in an optical mesh network simultaneously supporting traffic services at two or three different bit rates including a basic bit rate being 10 Gbps and at least one advanced, higher bit rate out of 40 Gbps and 100 Gbps, the method comprises the following operations (which may be performed irrespectively and independently of planning trails in the network):

providing in-line dispersion compensation for every span in the network so as to reach average residual dispersion RDS per span, being positive and lower than the dispersion that would be accumulated in up to about 3 km of an optical fiber of a type comprised in that span;

providing start points (say, ADD points) of possible trails in the network with respective external, pre-compensation negative Dispersion Compensation modules (DCMs), and providing termination points (say, DROP points) of possible trails in the network with respective external, post-compensation positive dispersion DCMs.

The mentioned three bit rates should be understood as bit rates substantially close to 10 G, 40 G and 100 G respectively.

The above method allows creating the desired dispersion map without planning traffic trails in advance and without information about bit rate to be used in any specific trail, while the obtained dispersion map is found to be suitable for any arbitrary trail of traffic at any of the mentioned bit rates.

The term "external" DCM should be understood as not belonging to the main part of the trail(s) it serves, i.e. the module which is not "seen"/does not form part in trails of express channels passing through the same node.

The advanced bit rates presently discussed are 40G Gbit/sec and 100 Gbit/sec. As has been noticed by the Inventor, the dispersion requirements to 40 Gbps traffic services are similar to those for 100 Gbps traffic services. It should be noted that values of real bit rates used in the network should be understood as approximate but close to the above-given numbers.

Preferably, DC modules are regular DCF (DC fiber) modules. Further preferably, for transmission fibers of the network which have positive dispersion (ps/nm/km), values of the external pre-compensation DC modules are negative and selected in the range of about 0 to −40 km times the material dispersion coefficient of the optic fiber comprised in the span, and values of the post-compensation DC modules are positive and selected in the range of about 20 to 40 times the material dispersion coefficient of the span's fiber.

In quite a lot of practical examples, the value of −20 km for pre-compensation and the value of +20 km for post-compensation can be considered sufficient and satisfactory. Therefore, the value (−20 km) for pre-compensation and the value of (+20 km) for post compensation may be used as default values in a practical mesh network supporting the two or three mentioned bit rates.

Preferably, the nodes of the network are ROADMs (though they may be OADMs, cross-connects, switches—any optical equipment allowing adding and/or termination of traffic flows at the node). The start points are preferably add inputs, and the termination points are drop outputs of the nodes.

Since, according to the method, RDS per span is selected to be positive and less than about 3 km, the requirement to 10 G trails (total RDS<80 km) is fulfilled in practice. Usually, when a trail comprises up to 20 spans (which is normal in practice), the requirement is easily satisfied.

In some particular cases the RDS may be positive and less than 40 km. Total residual dispersion (RDS) per trail of service may be positive and lower than 40 or 80 km, depending on the linear dispersion tolerance of the specific transmitter used in the trail (the tolerance is usually defined/shown on each transceiver).

However, the method may comprise an additional step: the length of a trail(s) for traffic at the basic bit rate (10 Gbps) may be selected such, that the total residual dispersion RDS be less than linear dispersion tolerance of a transceiver to be used in the network (for example, less than 80 km or even less than 40 km, according to the case).

Actually, the Inventor has proposed the method which builds the common dispersion map of an optical mesh network by simultaneously satisfying requirements to trails of traffic at the basic bit rate and requirements to trails of traffic at one or more advanced bit rates.

It should be noted that the method does not depend on real topology of traffic trails. The trails may be planned, but may be just supposed as theoretically possible.

The method may be formulated from the point of merging two different requirements:

A method for compensating dispersion in a mesh optical network, comprising nodes (ROADM etc.), designed to support services at one or both of the following bit rates: a basic bit rate 10 Gbps and at least one advanced bit rate among 40 Gbps or 100 Gbps, the method comprising forming a common dispersion map simultaneously satisfying both a first set and a second set of requirements, wherein:

a first set of requirements 1, 2 for services at the basic bit rate:
  total residual dispersion per trail of service is positive and lower than the linear dispersion tolerance (80 km, 40 km, possibly something else);
  residual dispersion RDS of the last span is larger than about 20 km. and a second set of requirements 3, 4 for services at the second bit rate:
  a pre-compensation (a pre-DCF) of about −20 km per trail of service;
  average residual dispersion RDS per span is positive and less than 3 km;
wherein the step of forming the common map is performed by ensuring in the network the second set of requirements, while:
  placing the pre-DCF of about (0 to −40 km) externally, at every possible/planned beginning of trail of any bit rate (say, by placing the pre-DCF at an Add port of ROADM, or at any terminal Add port of a possible or planned trail at any node), and
  ensuring the RDS of every planned/possible trail less than about 3 km, while satisfying the first set of requirements by adding "an external" dispersion of about 20 km (i.e., a fiber or a positive DCF) at every terminal drop output (say, a drop output of ROADM) which may be used by trail of any bit rate.

Owing to the above-proposed method of optimized dispersion compensation in the mesh network, the dispersion map becomes common, optimized and universal for every possible trail of every possible service in the mesh network, regardless of using by the service said first or said second bit rate.

The step of adding the "external" positive DCF/fiber creating dispersion of about 20 km at outputs of any trail in the network (preferably, at all Drop outputs of OADMs, ROADMs, etc) is suitable for both the first, and the second bit rates since such an external positive DCF/fiber:
- will always "sit" at the last span and will successfully play its part for 10G (first bit rate) services;
- will not be "accumulated" from span to span in a trail, so will not disturb trails using some specific span as an intermediate span;
- will not have its impact (+20 km) on the 40G or 100G services, since any 40G or 100 G receiver has its inherent dispersion compensation unit which would compensate the irrelevant 20 km. (The inherent dispersion compensation unit may be either a Tunable optical dispersion compensator TODC in non-coherent receivers, or a digital signal processor in coherent receivers.)

Formally the method may comprise a preliminary practical step—ensuring that receivers intended for receiving 40 G and 100 G services are provided with internal dispersion compensators, capable of compensating dispersion of more than 20 km.

Preferably, the method comprises providing all ADD input ports of ROADMs in the mesh network with the external pre-compensation DC module of about (−20 km); and providing all output DROP ports of ROADMs in the mesh network with an external post-compensation DC module of about +20 km.

According to the second aspect of the invention, the Inventor has also proposed an optical mesh network with a dispersion map simultaneously suitable for any arbitrary trail of traffic services at two or more different bit rates, more specifically—for traffic services at the basic bit rate 10 G and at least one of advanced bit rates being 40 G and 100 G.

More specifically, there is provided a mesh optical network comprising network nodes interconnected by spans and having a dispersion map rendering the network capable of simultaneously serving traffic services having the basic bit rate and traffic services at least at one of the advanced bit rates, wherein the network (and the dispersion map) being characterized in that every arbitrary trail of any possible traffic service:
- is provided with an external pre-compensation module (for example, a negative pre-DCF having a value of about 0 to −40 km), placed at the input to the trail (so as not to form part of the first span of the trail);
- is ensured to have average residual dispersion RDS per span positive and less than about 3 km;
- is provided with an external post-compensation positive dispersion module (for example, a fiber or a positive DCF having a value of about +20 to 40 km) at its terminal output (so as not to form part of the last span of the trail).

Preferably, the start points are add inputs of the nodes, while the termination points are drop outputs of the nodes.

It should be kept in mind that each receiver intended for receiving traffic service of 40 Gbps/100 Gbps is preferably provided with an internal dispersion compensation means capable of compensating dispersion of more than 20 km.

Preferably, at least some of the network nodes respectively comprise ROADMs. However, any switching device (OADm, Optical cross-connect OXC, optical switch) allowing for inputting and outputting specific optical signals at the node will be applicable. The network may comprise different network nodes.

In a specific case, at least some of the nodes in the proposed mesh network are ROADMs, wherein:
said external pre-compensation DCMs of about (−20 km) are placed at each ADD port of each ROADM in the network, and
said external post-compensation DCMs of about +20 km are placed at each DROP output at each ROADM in the network.
The invention will be described in more details as the description proceeds.

BRIEF DESCRIPTION OF THE DRAWINGS

The above invention will be further described and illustrated with the aid of the following non-limiting drawings in which:

FIG. 1 (prior art) is a schematic block—diagram of an optical mesh network where the dispersion map satisfies requirements of 10 Gbps traffic services.

FIG. 2 (prior art) is a schematic block—diagram of a portion (a trail) of an optical network, satisfying requirements to dispersion compensation for 40 Gbps traffic services.

DETAILED DESCRIPTION OF THE PREFERRED EMBODIMENTS

Figure 3:
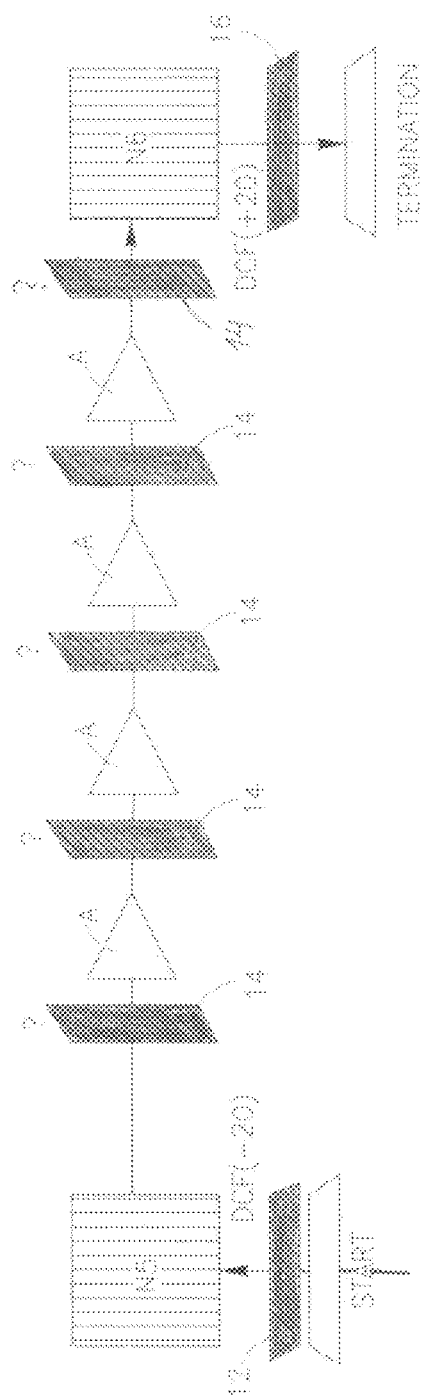
FIG. 3 is a schematic block-diagram of an exemplary multi-link trail in the proposed optical mesh network, which trail is provided with simple DCF facilities in the way satisfying requirements of both the 10 Gbps traffic and the 40 Gbps (100 Gbps) traffic.

FIG. 1 shows an optical mesh network 10 comprising a plurality of nodes schematically illustrated by hatched boxes N (N1, N2 . . . ). The nodes are interconnected by links, each equipped by at least one optical amplifier (schematically shown by triangles A). Trails of traffic services may be formed between each two nodes of the network. It is accepted in practice that for traffic services having bit rate 10 GB/s, a trail (say, the trail between N1 and N2) should have a positive total (trail) residual dispersion RDS being lower than 80 km. The total RDS<80 of the trail N1-N2 (see a solid thick line) is schematically marked in the drawing near the line.

There is another (second) practical requirement for traffic of 10 Gbps, which has been noticed by the Inventor. The RSD of the last span of the trail should be greater than of about +20 km. But now let us look at the drawing and ask: "which span in the mesh network can be considered to be the last span?" or practically "which span should be provided with means to make its RSD greater than 20 km?"

It should be reminded, that in the mesh network, every span may occur to be the last span of a specific trail. Also, if any specific trail comprises only one span, the two above-mentioned requirements are already contradicting for 10 Gbps, i.e. cannot be satisfied simultaneously.

FIG. 2 schematically illustrates how might look a trail between nodes N3 and N4, of a traffic service having the bit rate of 40 Gbps, from the point of dispersion map of the trail. It is considered in practice, that for such a service trail a pre-compensating DCF 12, having a negative dispersion value in the range between 10-40 km (in this example the value is −20 km), should be provided at the beginning of the trail. Then, DCF blocks 14 (marked with a question mark to indicate their unknown value) are to selected at each span so as to bring the average residual dispersion per span to the value of about RDS<3 km.

The Inventor believes that the requirements discussed with respect to traffic of 40 Gbps are actually the same for traffic of 100 Gbps.

It can be seen from FIGS. 1 and 2, that the 10 Gbps and the 40 Gbps (100 Gbps) dispersion map requirements are very hard to satisfy simultaneously, especially in a mesh network where trails of different services can hardly be predetermined in advance.

However, the non-linear penalty (impairments) in optical networks critically depends on the dispersion map of each specific trail and finally—on the dispersion map of the network.

Though 10 Gbps and 40 Gbps channels/trails of services must have different optimal dispersion maps, they in practice need to share one common physically existing dispersion map. Moreover, in a mesh network the dispersion map should be adapted so that to be optimized for every possible trail of service having any discussed bit rate, whenever established in the network.

The following FIG. 3 will illustrate the proposed technique which allows solving the outlined problem for a specific trail.

FIG. 3 schematically shows a trail N5-N6 which is built according to dispersion requirements to traffic having the bit rate of 40 Gbps (see FIG. 2), but the output of the last span is provided with an external DCF unit (+20 km in this example; may be up to of about 40 km), to adapt the last span to the requirement of traffic services of 10 Gbps. The output of node N6 will be used only by the specific trail/trails terminating at node N6 (for example, the output may be a terminal drop output of a ROADM). The "external" DCF unit 16 at the output of node N6 will not form part of any trail which may pass via node N6, so will serve exactly the purpose of forming the required residual dispersion of the last span for the trails terminating at node N6.

Actually, every termination point at nodes (OADMs/ROADMs/OXCs/Switches) in the mesh network may be provided with such an "external" DCF block like DCF 16.

Similarly, every add input of each OADM in the mesh network may be provided with the discussed pre-DCF, to make any trail starting at OADM node suitable for the common dispersion map. Such an attempt is shown in the following FIG. 4.

Figure 4:
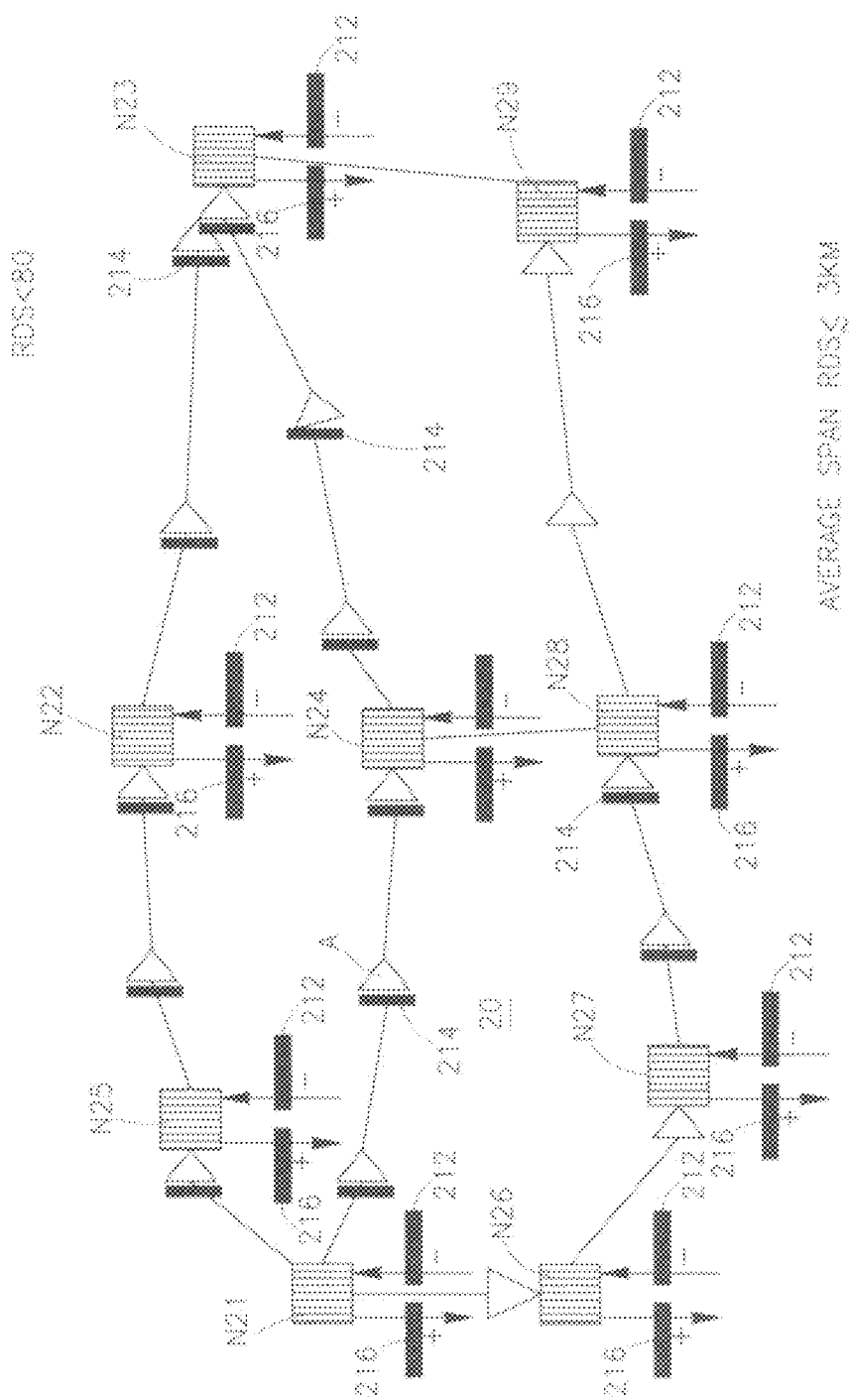
FIG. 4 is a schematic block-diagram of one specific example of the proposed optical mesh network, where the common dispersion map simultaneously satisfies requirements of the 10 Gbps traffic, the 40 Gbps traffic and 100 Gbps traffic.

FIG. 4 schematically illustrates an example of a mesh optical network 20 comprising RODM nodes (hatched boxes N21-N20), where DCF modules 214 (a link/span DCF) are selected so that the average link/span RDS is < of about 3 km (as required for 40 Gbps traffic trails). Other, non-ROADM network nodes may exist but they are not shown in the present example.

Usually, the requirement of 10 Gbps to have the overall RSD of the trail <80 km (or sometimes less than 40 km) can be satisfied simultaneously if a trail is not longer than about 20 spans, which is a normal practice.

Then at each node (N21-N29) of the network, each add input is provided with an "external" pre-DCF module 212 having the value of about (−20 km) Therefore any trail, starting from a transmitter connected to an add port of a ROADM, will be pre-compensated according to the requirements of 40 Gbps traffic.

Finally, every drop output of each OADM may be provided with an "external" DCF unit 216 having value of about (+20 km), to satisfy the last span requirement of the 10 Gbps traffic—this is the proposed arrangement in the dispersion map of the network 20 for cases when traffic of 10 Gbps is outputted from a drop output of any specific OADM. Such an "external" unit 216 will not have any impact on the 40 Gbps traffic since every 40 Gbps or 100 Gbps receiver (not shown, but supposed to be connected to any drop output shown in FIG. 4) will compensate it by means of its inherent tunable optical dispersion compensation unit (TODC).

It should be appreciated that though the invention has been described with reference to specific examples, other versions of the method, additional advanced bit rates may be considered, and additional embodiments of the network may be proposed which are to be considered part of the invention as far as being defined by the claims which follow.

The invention claimed is:

1. A method for providing simultaneous traffic services at two or more different bit rates along each of a plurality of communication trails comprised in an optical mesh network said two or more different bit rates including a basic bit rate of essentially 10 Gbps and at least one, higher bit rate selected from among essentially 40 Gbps and essentially 100 Gbps, the method comprises: providing a plurality of communication trails, each comprising at least two network nodes interconnected by at least one fiber optic span, wherein one node being a starting point for a communication trail and another node being a termination point for said communication trail, and wherein said communication trail is operative to simultaneously convey traffic at two or more different bit rates;
   providing in-line dispersion compensation for each of the at least one fiber optic span comprised in said communication trail, thereby obtaining a positive average residual dispersion RDS at every fiber optic span of said communication trail which is no more than a dispersion that is accumulated in up to 3 km of an optical fiber of a type comprised in said fiber optic span;
   at the node being the starting point of the communication trail, applying negative dispersion pre-compensation, and
   at the node being the termination point of the communication trail, applying positive dispersion post-compensation,
   wherein for each of said plurality of communication trails, said pre-compensation, the in-line dispersion compensation at every fiber optic span and the post compensation are all provided irrespective of any specific bit rate of traffic that is currently being conveyed along each of said communication trails,
   thereby enabling simultaneous provisioning of traffic services at said two or more different bit rates within said optical mesh network.

2. The method according to claim 1, comprising providing external pre-compensation having a value that is equivalent to a dispersion that is accumulated along an optical fiber of a type comprised in a fiber optic span the proceeds said node being the starting point, which has a length in the range of 0 to −40 km, and post-compensation having a value that is equivalent to a dispersion that may be accumulated along an optical fiber of a type comprised in a fiber optic span the precedes said node being the termination point, which has a length in the range of 20 to 40 km.

3. The method according to claim 1, wherein the network nodes comprise ROADMs; the method further comprises providing all ADD input ports of the ROADMs in the mesh network with respective external pre-compensation DCMs having a negative value that is equivalent to a negative value of dispersion that is accumulated along an optical fiber of a type comprised in a fiber optic span that proceeds a respective ROADM, which has a length of about 20 km; and providing all output DROP ports of the ROADMs in the mesh network with respective external post-compensation DCMs having a positive value that is equivalent to a positive value of dispersion that may be accumulated along an optical fiber of a type comprised in a fiber optic span that precedes a respective ROADM, which has a length of about 20 km.

4. An optical mesh network configured for simultaneously providing traffic services along each of a plurality of communication trails at two or more different bit rates, said two or more different bit rates including a basic bit rate of essentially 10 Gbps and at least one higher bit rate selected from among essentially 40 Gbps and essentially 100 Gbps, the network comprising:

a plurality of communication trails, wherein each of said plurality of communication trails is associated with:

two network nodes interconnected by at least one fiber optic span wherein one node being a starting point for a communication trail and another node being a termination point for said communication trail, and wherein said communication trail is operative to simultaneously convey traffic at two or more different bit rates;

at least one Dispersion Compensation Module (DCM) associated with the at least one fiber optic span, wherein the at least one DCM is configured to provide in-line dispersion compensation for a respective fiber optic span of the at least one fiber optic span comprised in said communication trail, thereby to enable obtaining a positive average residual dispersion at every fiber optic span of said communication trail being no more than a dispersion that is accumulated in to 3 km of an optical fiber of a type comprised in said fiber optic span;

wherein the node being the starting point for said communication trail is provided with an external pre-compensation negative DCM;

wherein the node being the termination point for said trail is provided with an external, post-compensation positive DCM; and wherein for each of said plurality of communication trails, each of said pre-compensation DCM, the at least one DCM associated with the at least one fiber optic span and said post compensation DCM are operative irrespective of any specific bit rate of traffic that is currently being conveyed along each of said communication trails, thereby enabling simultaneous provisioning of traffic services at said two or more different bit rates within said optical mesh network.

5. The network according to claim 4, wherein the node being the starting point includes at least one ADD input port, while the node being the termination point includes at least one output DROP port.

6. The network according to claim 4, wherein the external pre-compensation DCM has a value that is equivalent to a dispersion that may be accumulated along an optical fiber of a type comprised in a fiber optic span the proceeds said node being the starting point, which has a length in the range of 0 to −40 km, and the post-compensation DCM has a value that is equivalent to a dispersion that may be accumulated along an optical fiber of a type comprised in a fiber optic span the precedes said node being the termination point, which has a length in the range of 20 to 40 km.

7. The network according to claim 4, further comprising receivers intended for receiving traffic service of 40 Gbps and/or 100 Gbps, the receivers being provided with internal dispersion compensation means capable of compensating dispersion that is equivalent to a dispersion that may be accumulated along an optical fiber of a type comprised in a fiber optic span the precedes said node being the termination point, which has a length of more than 20 km.

8. The network according to 4, wherein each of the network nodes comprise a reconfigurable optical add-drop multiplexer (ROADM) or at least one optical switches allowing for inputting and outputting optical signals.

9. The network according to claim 4, wherein the network nodes comprise ROADMs, and wherein external pre-compensation DCMs having a negative value that is equivalent to a negative value of dispersion that may be accumulated along an optical fiber of a type comprised in a fiber optic span that proceeds a respective ROADM, which has a length of about 20 km, are placed at each ADD port of each ROADM in the network, and external post-compensation DCMs having a positive value that is equivalent to a positive value of dispersion that may be accumulated along an optical fiber of a type comprised in a fiber optic span that precedes a respective ROADM, which has a length of about 20 km, are placed at each DROP output at each ROADM in the network.

* * * * *